(12) United States Patent
Close et al.

(10) Patent No.: US 10,067,907 B2
(45) Date of Patent: Sep. 4, 2018

(54) VEHICLE INCLUDING NOISE MANAGEMENT SYSTEM HAVING AUTOMOTIVE AUDIO BUS (A2B) INTERFACE

(71) Applicant: GM Global Technology Operations LLC, Detroit, MI (US)

(72) Inventors: Richard A. Close, Farmington Hills, MI (US); Frank C. Valeri, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/481,907

(22) Filed: Apr. 7, 2017

(65) Prior Publication Data

US 2017/0323631 A1 Nov. 9, 2017

Related U.S. Application Data

(60) Provisional application No. 62/332,078, filed on May 5, 2016.

(51) Int. Cl.
*G10K 11/16* (2006.01)
*G06F 13/42* (2006.01)
*G10K 11/178* (2006.01)

(52) U.S. Cl.
CPC ...... *G06F 13/4291* (2013.01); *G10K 11/1785* (2018.01); *G10K 11/17881* (2018.01); *G10K 11/17883* (2018.01); *G10K 2210/1282* (2013.01); *G10K 2210/3016* (2013.01); *G10K 2210/3031* (2013.01); *G10K 2210/3044* (2013.01); *G10K 2210/3046* (2013.01)

(58) Field of Classification Search
CPC ............. G10K 11/178; G10K 11/1785; G10K 11/17881; G10K 11/17883; G10K 2210/128; G10K 2210/1282; G10K 2210/12822; G10K 2210/3016; G10K 2210/3031; G10K 2210/3044; G10K 2210/3046; H04R 1/1083; H04R 2410/05; H04R 3/02; H04R 3/002; H04R 3/005; H04R 2410/01
See application file for complete search history.

(56) References Cited

U.S. PATENT DOCUMENTS 5,475,761 A * 12/1995 Eatwell ............. G10K 11/1784
381/71.11
5,485,523 A * 1/1996 Tamamura ......... G10K 11/1784
381/71.4

(Continued)

*Primary Examiner* — Thang Tran
(74) *Attorney, Agent, or Firm* — Cantor Colburn LLP

(57) ABSTRACT

A vehicle includes at least one sensor and a body having an exterior portion and an interior portion. The sensor is configured to detect noise existing in the exterior portion and the interior portion, and to output at least one noise signal indicative of the detected noise. The vehicle further includes at least one noise cancellation and enhancement (NCE) controller and an automotive audio bus (A2B) interface. One or more of the NCE controllers are configured to perform at least one noise management signal processing operation based on the at least one noise signal. The automotive audio bus (A2B) interface receives the at least one noise signal and delivers the at least one noise signal to the at least one NCE controller.

19 Claims, 3 Drawing Sheets

(56) References Cited

U.S. PATENT DOCUMENTS

| | | | | |
|---|---|---|---|---|
| 2002/0141601 | A1* | 10/2002 | Finn | H04R 3/005 |
| | | | | 381/92 |
| 2012/0257763 | A1* | 10/2012 | Bowden | G10K 11/178 |
| | | | | 381/71.4 |
| 2014/0233748 | A1* | 8/2014 | Klug | G10K 11/178 |
| | | | | 381/71.4 |
| 2016/0163304 | A1* | 6/2016 | Lee | G10K 11/178 |
| | | | | 381/71.4 |
| 2016/0171989 | A1* | 6/2016 | Gupta | G10K 11/175 |
| | | | | 381/302 |
| 2016/0300559 | A1* | 10/2016 | Lee | G10K 11/1788 |

* cited by examiner

VEHICLE INCLUDING NOISE MANAGEMENT SYSTEM HAVING AUTOMOTIVE AUDIO BUS (A2B) INTERFACE

CROSS-REFERENCE TO RELATED APPLICATIONS

The present application claims priority to U.S. Provisional Application No. 62/332,078, filed on May 5, 2016, the contents of which are incorporated by reference herein in its entirety.

INTRODUCTION

Various non-limiting embodiments relate generally to automotive vehicles, and more particularly, to noise management systems implemented in automotive vehicles.

Improving the automotive driving experience is not only focused on the handling and operation of the vehicle, but also includes improving the comfort level of the vehicle's interior environment. Noise management systems have been installed on vehicles which perform various signal processing techniques to enhance, suppress and/or eliminate noise from within the vehicle interior cabin. Automotive noise management systems may include one or more sensors (e.g., microphones, accelerometers, etc.) installed at various locations of the vehicle to monitor and detect noise sources such as, for example, wind noise, vehicle vibrations, road surface noise, engine noise, tire cavity noise, or other vibration-based noises caused by moving vehicle parts which are transferred to the vehicle cabin, sometimes referred to as cabin impact boom.

Noise management systems typically perform several different processing techniques to suppress interior noise. However, current implementations require that the feedback or output of the sensors is wired directly to a single processing source, i.e., a single Noise Management (NM) module. As a result, only a single NM module can be utilized to perform the multitude of processing techniques to suppress the interior noise. Moreover, the requirement to connect all sensor outputs to a single NM module increases wiring costs, increases vehicle weight, and causes processing latency that creates limitations in system architecture.

SUMMARY

In at least one non-limiting embodiment, a vehicle includes at least one sensor and a body having an exterior portion and an interior portion. The sensor is configured to detect noise existing in the exterior portion and the interior portion, and to output at least one noise signal indicative of the detected noise. The vehicle further includes at least one noise cancellation and enhancement (NCE) controller and an automotive audio bus (A2B) interface. One or more of the NCE controllers are configured to perform at least one noise management signal processing operation based on the at least one noise signal. The automotive audio bus (A2B) interface receives the at least one noise signal and delivers the at least one noise signal to the at least one NCE controller.

In addition to one or more of the features described herein, or as an alternative, further embodiments include, wherein the at least one noise management signal processing operation includes comparing, with the at least one NCE controller, a first noise signal associated with the exterior portion and a second noise associated with the interior portion, generating, with the at least one NCE controller, a post-processed signal in response to phase-shifting the first noise signal based on the second noise signal, and converting the post-processed signal into an audio signal that is emitted into the interior portion of the vehicle such that the noise associated with exterior portion is at least one of suppressed and enhanced.

In addition to one or more of the features described herein, or as an alternative, further embodiments include, wherein the at least one sensor and the at least one NCE controller are connected to the A2B interface in a daisy-chain configuration.

In addition to one or more of the features described herein, or as an alternative, further embodiments include, wherein the at least one sensor includes at least one accelerometer located at the exterior portion and at least one microphone located at the interior portion.

In addition to one or more of the features described herein, or as an alternative, further embodiments include, wherein the at least one NCE controller includes a plurality of NCE controller, and each NCE controller among the plurality of NCE controllers performs a different noise management signal processing operation with respect to one another.

In addition to one or more of the features described herein, or as an alternative, further embodiments include, wherein the A2B interface is a clock-driven twisted-pair digital communication bus.

According to another non-limiting embodiment, a noise management system installed in a vehicle comprises an automotive audio bus (A2B) interface configured to transfer data thereon, at least one first sensor configured to monitor an exterior environment of the vehicle, and at least one second sensor configured to monitor an interior environment of the vehicle. The at least one first sensor is configured to output first data to the A2B interface indicative of exterior noise, and the at least one second sensor configured to output second data to the A2B interface indicative of interior noise. A plurality of noise cancellation and enhancement (NCE) controllers are connected to the A2B interface. The plurality of NCE controllers are configured to generate post-processed data in response to performing a noise management signal processing operation based on at least one of the first and second data received from the A2B interface, wherein the post-processed data is converted into an audio signal that is output so as to at least one of suppress and enhance the exterior noise.

In addition to one or more of the features described herein, or as an alternative, further embodiments include, wherein the at least one first sensor, the at least one second sensor, and the plurality of NCE controllers are connected to the A2B interface in a daisy-chain configuration.

In addition to one or more of the features described herein, or as an alternative, further embodiments include, wherein the at least one noise management signal processing operation includes comparing, using the at least one NCE controller, the first data associated with the exterior portion and the second data associated with the interior portion, and generating, using the at least one NCE controller, the post-processed signal in response to shifting phase data included in the first data based on the second data.

In addition to one or more of the features described herein, or as an alternative, further embodiments include, wherein the at least one first sensor is an accelerometer and the at least one second sensor is a microphone.

In addition to one or more of the features described herein, or as an alternative, further embodiments include, wherein each NCE controller among the plurality of NCE controllers performs a different noise management signal processing operation with respect to one another.

In addition to one or more of the features described herein, or as an alternative, further embodiments include, wherein a first NCE controller outputs a first post-processed signal and a second NCE controller, different from the first NCE controller, simultaneously outputs a second post-processed signal.

In addition to one or more of the features described herein, or as an alternative, further embodiments include, wherein the A2B interface is a clock-driven twisted-pair digital communication bus.

In yet another non-limiting embodiment, a method of managing noise associated with an automotive vehicle comprises detecting, using at least one sensor, noise existing in an exterior portion of the vehicle and an interior portion of the vehicle, and outputting at least one noise signal indicative of the detected noise. The method further includes performing, with a first noise cancellation and enhancement (NCE) controller, a first noise management signal processing operation based on the at least one noise signal, and performing, with a second NCE controller, a second noise management signal processing operation based on the at least one noise signal. The method further includes receiving, by an automotive audio bus (A2B) interface, a first post-processed signal from the first NCE controller and a second post-processed signal from the second NCE controller. The method further includes converting, by a third NCE controller different from the first and second NCE controllers, the first and second post-processed signals into an audio signal. The method further includes outputting the audio signal into the interior portion of the vehicle so as to at least one of suppress and enhance noise associated with the exterior portion of the vehicle.

In addition to one or more of the features described herein, or as an alternative, further embodiments include, wherein the at least one noise management signal processing operation includes comparing a first noise signal associated with the exterior portion and a second noise signal associated with the interior portion, and generating the first and second post-processed signals in response to phase-shifting the first noise signal based on the second noise signal.

In addition to one or more of the features described herein, or as an alternative, further embodiments include, wherein the at least one sensor and the plurality of NCE controllers are connected to the A2B interface in a daisy-chain configuration.

In addition to one or more of the features described herein, or as an alternative, further embodiments include, wherein the at least one sensor includes at least one accelerometer located at the exterior portion and at least one microphone located at the interior portion.

In addition to one or more of the features described herein, or as an alternative, further embodiments include, wherein each NCE controller among the plurality of NCE controller performs a different noise management signal processing operation with respect to one another.

In addition to one or more of the features described herein, or as an alternative, further embodiments include, wherein a first NCE controller outputs a first post-processed signal and a second NCE controller, different from the first NCE controller, simultaneously outputs a second post-processed signal.

In addition to one or more of the features described herein, or as an alternative, further embodiments include, wherein the A2B interface is a clock-driven twisted-pair digital communication bus.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DESCRIPTION OF THE EMBODIMENTS

Figure 1:
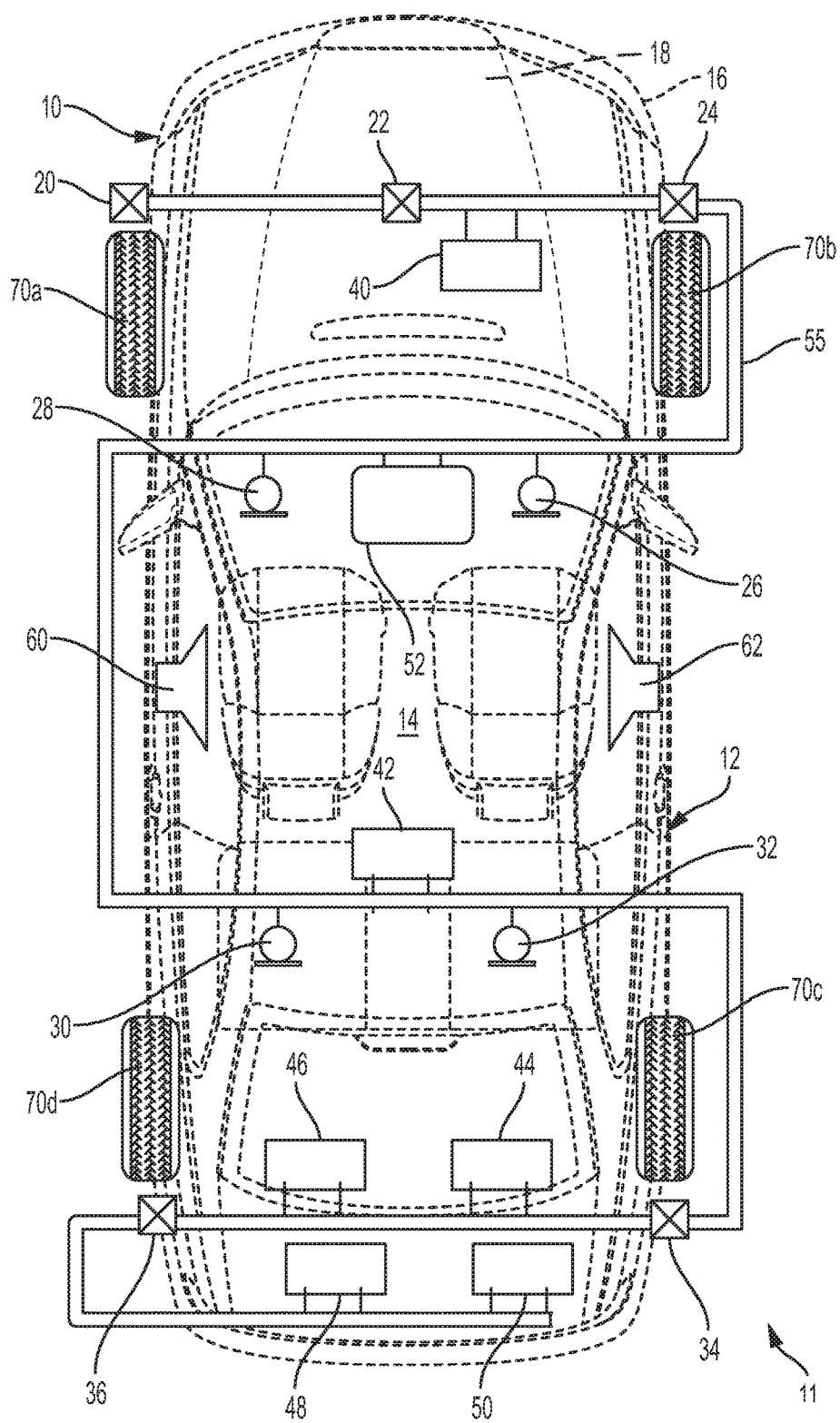
FIG. 1 illustrates a vehicle including a noise management system having an automobile audio bus (A2B) interface according to a non-limiting embodiment.

The following description is merely exemplary in nature and is not intended to limit the present disclosure, its application or uses. It should be understood that throughout the drawings, corresponding reference numerals indicate like or corresponding parts and features. Various non-limiting embodiments provide an automotive noise management system having an automotive audio bus (A2B) interface. The A2B interface (e.g., communication bus) controls one or more outputs between one or more sensors and one or more electronic noise cancellation and enhancement (NCE) controllers. The A2B interface is configured to support direct point-to-point connections while allowing multiple nodes to be connected in a daisy-chain configuration. A node may include a controller, receiver, and/or a sensor. In at least one embodiment, several individual NCE controllers may be connected to the A2B interface. Each individual NCE controller may perform a different noise management signal processing operation. In this manner, each individual NCE controller may simultaneously perform their respective noise cancellation and enhancement operation on the noise sensor outputs delivered to the A2B interface. Accordingly, reduced wiring is necessary to deliver noise sensor output, while overall latency is significantly reduced.

Turning now to FIG. 1, a vehicle 10 is illustrated which implements a noise management system 11 including an automobile audio bus (A2B) interface according to a non-limiting embodiment. The noise management system 11 is configured to perform at least one noise management signal processing operation such as, for example, a noise cancellation operation and/or a noise enhancement operation using various signal cancelling and sound altering techniques. The vehicle 10 includes a body 12 that defines an interior portion 14 and an exterior portion 16. The exterior portion 16 also defines an engine compartment 18, an underbody (not shown), and wheel wells (not shown).

The noise management system 11 includes a plurality of sensors 20, 22, 24, 26, 28, 30, 32, 34 and 36, and a plurality of electronic noise cancellation and enhancement (NCE) controllers 40, 42, 44, 46, 48 and 50. The sensors 20, 22, 24, 26, 28, 30, 32, 34 and 36 and the NCE controllers 40, 42, 44, 46, 48 and 50 are in signal communication with one another via an automotive audio bus (A2B) interface 55. In at least one embodiment, an electronic head unit 52 is also in signal communication with the A2B interface 55. The head unit 52 is capable of executing various features including, but not limited to, vehicle media entertainment services such as, AM/FM radio functionality, audio streaming playback, and satellite radio functionality. The head unit 52 may also be configured as a graphical user interface (GUI) including a control unit that processes signals from various sensors and sends information to various actuators. Accordingly, the head unit 52 may provide driver-interface functions including, but not limited to, voice control vehicle operations, hands-free services, emergency roadside assistance, navigation services, interior cabin speaker control, heating, ventilation, and air conditioning (HVAC) control, and camera monitoring display. In addition, the head unit 52 may include various local connections and processing circuitry including, but not limited to, audio analog-to-digital converters (ADCs), Bluetooth radio frequency (RF) communication interfacing, and audio digital-to-analog converters (DACs). Connections between audio DACs and amplifiers (not shown) may also be locally included in the head unit 52.

In at least one non-limiting embodiment, one or more exterior sensors 20, 22, 24, 34, and 36 are configured as accelerometers, for example, and are arranged at various areas of the vehicle's exterior portion 16. The external areas of installation include, but are not limited to, the engine compartment 18, wheel wells, and the underbody. One or more interior sensors 26, 28, 30, and 32 are configured as microphones, for example, and are arranged about vehicle's interior portion 14 such as, for example, within the cabin area of the vehicle 10. In addition, the vehicle 10 includes one or more speakers 60 and 62 arranged about the vehicle's interior portion 14. The vehicle 10 is supported by four tires 70a, 70b, 70c, and 70d that, during vehicle travel, may generate road noise through an interaction between tire tread and a road surface. Tire pressure, exterior temperature, and/or road conditions may also contribute to noise realized within the vehicle's interior portion 14 as tires 70a-70d interact with the road surface.

The NCE controllers 40, 42, 44, 46, 48 and 50 are configured to perform a noise management signal processing operation based on the data and information output from one or more of the sensors 20, 22, 24, 26, 28, 30, 32, 34 and 36. In at least one embodiment, the NCE controllers include, but are not limited to, an engine sound enhancement (ESE) NCE controller 40, a road noise cancellation (RNC) NCE controller 42, an active noise cancellation (ANC) NCE controller 44, a driveline ANC (D-ANC) NCE controller 46, a masking sound enhancement (MSE) NCE controller 48, and a noise management amplifier (NMAMP) controller 50. Each NCE controller 40, 42, 44, 46, 48 and 50 is configured to perform a different noise management signal processing operation. In addition, each of the NCE controllers 40, 42, 44, 46, 48 and 50 can be configured as an electronic hardware controller that includes a central processing unit (CPU) and non-volatile memory. The memory has stored thereon instructions that, when executed by the CPU, commands the CPU to perform the respective noise management signal processing operation of the individual NCE controller 40, 42, 44, 46, 48 and 50.

The ESE NCE controller 40 is configured to utilize engine data (e.g., RPM and torque) to determine output enhancement frequencies and output audio levels. Accordingly, the ESE NCE controller 40 is capable of enhancing the sound of the vehicle's powertrain by adding powerfulness, character and/or refinement to data output from the one or more of the sensors (e.g., the engine compartment accelerometer 22).

The RNC NCE controller 42 is configured to utilize exterior vehicle data, e.g., data output by one or more accelerometers 20, 22, 24, 34, and 36 to determine the noises, vibrations and frequency necessary to cancel road noise. The RNC NCE controller 42 then uses the interior microphones 26, 28, 30, and 32 to align and verify that sound or a particular undesirable noise is present in the interior of the vehicle 14 (e.g., the vehicle cabin). The microphones 26, 28, 30, and 32 may also dynamically control the output signal such that the system algorithm can continually adapt and improve its performance during real-time. In this manner, cabin boom and/or tire cavity (e.g., wheel well) noise may be suppressed or eliminated.

The ANC NCE controller 44 utilizes engine data such as RPM data, for example, to determine the frequency necessary to cancel noise produced by the vehicle's engine. The ANC NCE controller 44 then utilizes the interior microphones 26, 28, 30, and 32 to phase-align the output from the speakers 60-62. In this manner, noise generated by the engine, noise caused by induction and exhaust airflow and/or noise caused by air radiating from/through a structure (e.g., un-sealed window, door passage, etc.) of the vehicle 10 may be suppressed or eliminated.

The D-ANC NCE controller 46 utilizes transmission output speed to determine a frequency capable of cancelling driveline component noise. The D-ANC NCE controller 46 may then use the interior microphones 26, 28, 30, and 32 to phase-align the output from the speakers 60 and 62. Accordingly, noise resulting from an unbalanced driveshaft and/or half shaft may be suppressed or eliminated.

The MSE NCE controller 48 utilizes one or more of data generated by the transmission, engine, electric motor speed, and/or other vehicle components (e.g., wheels 70a-70d) to determine a distraction frequency (e.g., white noise frequency) of a cabin injection sound capable of masking tonal annoyance sounds that are naturally generated by the powertrain system of the vehicle. The cabin injection sound may include, for example, white noise having a distraction frequency ranging from about ranging from about 20 hertz (Hz) to about 20 kilohertz (kHz). The white noise is then injected into the cabin via the speakers 60 and 62 so as to mask undesirable sounds generated by the powertrain system.

In at least one non-limiting embodiment, the MSE NCE controller 48 monitors the output from the accelerometers 20, 22, 24, 34, and 36 as vehicle 10 travels over a road surface. The MSE NCE controller 48 can determine specific frequencies known to be associated with undesirable sounds based on data (e.g., detected vibrations) output from the accelerometers 20, 22, 24, 34, and 36. During design, construction and/or testing of the vehicle 10, for example, particular frequencies can be identified which correspond to undesirable sounds in a particular frequency band. If audible signals indicated by one or more of accelerometers 20, 22, 24, 34, and 36 are deemed to be undesirable, the MSE NCE controller 48 emits a masking signal through one or more of speakers 60 and 62. The term "undesirable" may be understood to describe an audible signal having a particular frequency and/or above particular decibel threshold that would be objectionable to passengers of vehicle 10.

The noise management amplifier (NMAMP) controller 50 is configured to perform processing on one or more post-processed audio signals output from one or more of the NCE controllers 40, 42, 44, 46 and 48. That is, unlike the single NM module included in other NM systems, the NMAMP controller 50 is capable of performing mixing, amplification or other processing operations on one or more post-processed signals output from the NCE controller 40, 42, 44, 46 and 48. According to at least one non-limiting embodiment, the NMAMP controller 50 is configured to receive the post-processed NCE signals, sum the received post-processes signals to the audio stream, and output the total audio stream via the speakers 60 and 62.

As described above, the sensors 20, 22, 24, 26, 28, 30, 32, 34 and 36 (e.g., accelerometers and microphones) are in signal communication with the NCE controllers 40, 42, 44, 46, 48 and 50, along with the head unit 52 via an automotive audio bus (A2B) interface 55. In at least one embodiment, the A2B interface 55 is configured as a digital communication bus. For example, the A2B interface 55 can be configured as a twisted wiring pair (i.e., twisted-pair) clock-driven interface that supports direct point-to-point connections while allowing multiple nodes to be connected in a daisy-chain configuration. In this manner, the A2B interface 55 can exchange information provided by the sensors 20, 22, 24, 26, 28, 30, 32, 34 and 36 to one or more of the NCE controllers 40, 42, 44, 46, 48 and 50.

Unlike noise management systems that can be limited to implementing only one single NM module (e.g., a single NM from only a single vehicle supplier), at least one non-limiting embodiment allows for implementing multiple NCE controllers 40, 42, 44, 46, 48 and 50 where each NCE controller 40, 42, 44, 46, 48 and 50 is configured to execute a different noise management signal processing operation as discussed in greater detail below. In addition, the A2B interface 55 is able to simultaneously receive the outputs from the sensors 20, 22, 24, 26, 28, 30, 32, 34 and 36. Accordingly, each individual NCE controller 40, 42, 44, 46, 48 and 50 is capable of retrieving the relevant data provided by the sensors 20, 22, 24, 26, 28, 30, 32, 34 and 36 necessary for a particular NCE controller 40, 42, 44, 46, 48 and 50 to execute its respective noise management signal processing operation. After completing its respective operation, the respective NCE controller 40, 42, 44, 46, and 48 outputs its post-processed signal to the A2B interface 55, which is then received by the NMAMP controller 50. Accordingly, various different noise management signal processing operations may be executed simultaneously such that overall latency in the noise management system 11 is reduced.

As discussed herein, some NM systems can be limited to using only a single NM module such that the NM module must receive pre-processed signals directly from the point-to-point wired outputs of the sensors. Only after receiving the pre-processed signals can the NM module perform noise management operations which are subsequently mixed together causing significant latency in the system. Unlike NM systems that are limited to a single NM module, however, at least one non-limiting embodiment provides an A2B interface 55 that delivers one or more individual post-processed signals output from a respective NCE controller 40, 42, 44, 46, 48 to the NMAMP controller 50. Accordingly, NMAMP controller 50 can perform a final processing (e.g., mixing of signals, amplification, equalization, etc.) of one or more of the received post-processed signals, if necessary. According to at least one non-limiting embodiment, the final processing performed by the NMAMP controller 50 includes summing all post-processed signals at the final stage of the audio system such that the signals are output in an appropriate amount of time to cancel the noise that already exists in the vehicle. In this manner, latency issues that exist in NM systems may be significantly reduced, or even eliminated.

Figure 2:
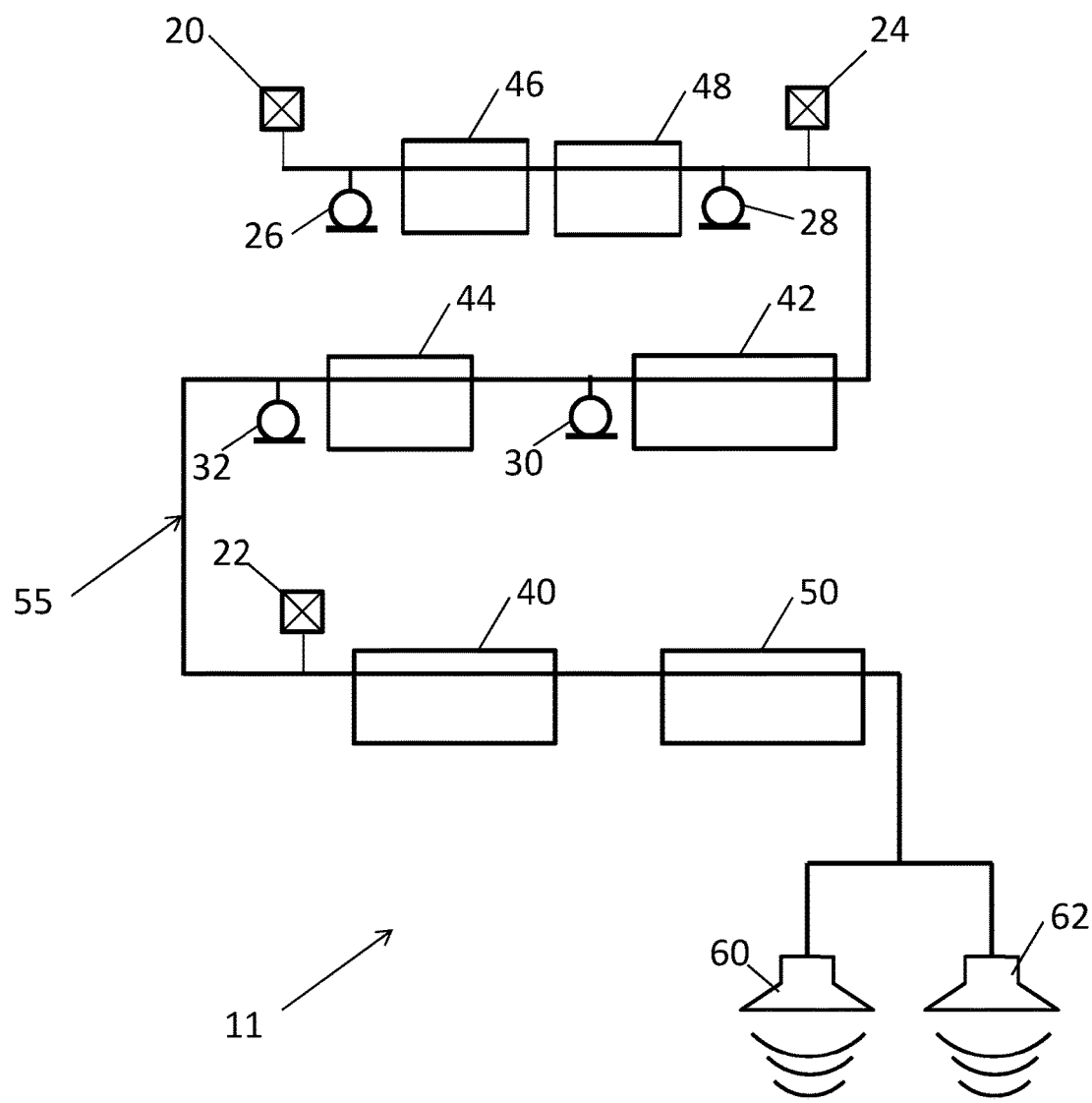
FIG. 2 is a block diagram illustrating a noise management system including an A2B interface according to a non-limiting embodiment.

Turning now to FIG. 2, a noise management system 11 including an A2B interface 55 is illustrated according to a non-limiting embodiment. The A2B interface 55 is configured to support multiple NCE controllers 40, 42, 44, 46, 48, and 50 and/or sensors 20, 22, 24, 26, 28, 30 and 32 in a daisy-chain electrical configuration. For example, the NCE controllers are daisy-chained starting with a driveline ANC (D-ANC) NCE controller 46, followed by an MSE NCE controller 48, a RNC NCE controller 42, an ANC NCE controller 44, an ESE NCE controller 40, and ending with a NMAMP controller 50. The sensors connected to the A2B interface 55 include wheel well accelerometers 20 and 24, an engine compartment accelerometer 22, and interior audio noise cancellation (ANC) microphones 26, 28, 30 and 32, for example. The sensors 20, 22, 24, 26, 28, 30 and 32 illustrated in FIG. 2 are examples, and it should be appreciated that other accelerometers and/or microphones may be installed at other exterior and interior portions of the vehicle.

Each individual NCE controller 40, 42, 44, 46, 48, and 50 can perform a different noise management signal processing operation. The accelerometers 20 and 24 and/or ANC microphones 26, 28, 30, and 32 can simultaneously output their data onto the A2B interface 55. The data existing on the A2B interface 55 can be selectively input to one or more of the NCE controllers 40, 42, 44, 46, 48, and 50. That is, each NCE controller 40, 42, 44, 46, 48, and 50 can select the data from the A2B interface 55 necessary to perform its respective noise management signal processing operations. Any data not required to perform the operation is passed through and made available for use by other NCE controllers 40, 42, 44, 46, 48, and 50. Accordingly, each individual NCE controller 40, 42, 44, 46, 48, and 50 can simultaneously perform their respective noise management signal processing operation on the noise sensor outputs delivered to the A2B interface 55. The outputs of each NCE controller 40, 42, 44, 46, 48, and 50 may also be simultaneously delivered to the A2B interface 55.

In at least one embodiment, the NMAMP controller 50 is connected downstream from the remaining NCE controllers 40, 42, 44, 46, and 48. In this manner, the NMAMP controller 50 can receive post-processed signals from one or more of the remaining NCE controllers 40, 42, 44, 46, and 48. For example, the NMAMP controller 50 can receive a first post-processed signal from the RNC NCE controller 42, and a second post-processed signal from the ANC NCE controller 44. The first post-processed signal output from the RNC NCE controller 42 can provide information indicating the existence of undesirable road noise within the vehicle cabin. The second signal is a phase-aligned frequency signal necessary to cancel noise produced by the vehicle's engine (not shown), for example. The NMAMP controller 50 receives the first and second post-processed signals, and applies final processing operations. As described above, the final processing can include summing all post-processed signals at the final stage of the audio system in order to output the signals in an appropriate amount of time in order to cancel the noise that already exists in the vehicle cabin. The final signal is output from the NMAMP controller 50 to the speakers 60 and 62 where it is emitted into the vehicle cabin so as to suppress the overall undesirable noise exposed to one or more occupants of the vehicle. Accordingly, multiple post-processed signals can be processed (e.g., mixed together) by the NMAMP controller 50 thereby reducing system latency.

Figure 3:
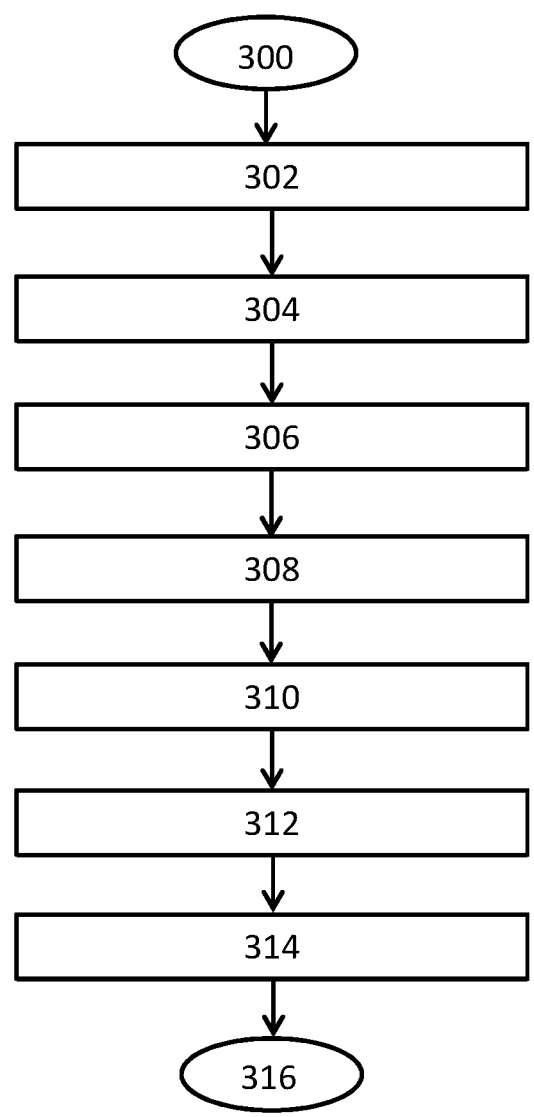
FIG. 3 is a flow diagram illustrating a method of performing noise cancellation and enhancement in an automotive vehicle according to a non-limiting embodiment.

Turning now to FIG. 3, a method of performing noise cancellation and enhancement in an automotive vehicle is illustrated according to a non-limiting embodiment. The method begins at operation 300, and at operation 302 the exterior noise and/or interior noise associated with the vehicle is monitored. The exterior noise may be monitored by one or more accelerometers installed at various exterior portions of the vehicle. The interior noise may be monitored by one or more microphones (e.g., ANC microphones) installed at various interior portions of the vehicle. At operation 304, the accelerometers and/or microphones output data indicative of the monitored noise to an A2B interface installed on the vehicle. In at least one embodiment, the accelerometers and/or microphones simultaneously output the data to the A2B interface as the noise is detected. At operation 306, each individual NCE controller selects desired data from among the total data existing on the A2B interface. For example, the ESE NCE controller 40 can select engine noise data from the A2B bus to generate a post-processed signal based engine frequencies and engine output audio levels to enhance engine noise within the vehicle cabin. The ANC NCE controller 44 can disregard the engine noise data, but can select wind noise data, induction noise data, exhaust airborne noise data, and/or road surface noise data to generate a post-processed signal to suppress wind noise and/or road surface noise from within the vehicle cabin.

At operation 308, each NCE controller performs its respective noise management signal processing operation on the data obtained from the A2B interface. In at least one embodiment, the NCE controllers perform the cancellation and/or enhancement operations simultaneously with respect to one another. At operation 310, post-processed signals generated by the NCE controllers are output to the A2B interface. In at least one embodiment, the post-processed signals may be simultaneously output to the A2B interface. At operation 312, final processing is performed on the post-processed signals. The final processing includes, but is not limited to, mixing and amplifying the post-processed signals received by a NMAMP controller installed as the final stage in the daisy-chain A2B interface. In at least one embodiment, the NMAMP controller receives the post-processed signals and sums all the post-processed signals at the final stage of the audio system in order to output the signals in an appropriate amount of time in order to cancel the noise that has already exists in the vehicle. At operation 314, the NMAMP controller delivers the final processed signal to one or more speakers installed in the vehicle. The speakers output the final processed signal (e.g., emits an audio signal) that suppresses undesired noise exposed to an occupant of the vehicle, and the method ends at operation 316.

As described in detail above, various non-limiting embodiments provide an automotive noise management system having an A2B interface capable of simultaneously generating post-processed noise cancellation and enhancement signals. These post-processed signals may then undergo final processing by a separate NCE controller before being output to the interior of the vehicle. In at least one embodiment, several individual NCE controllers may be connected to the A2B interface. Each individual NCE controller may perform a different noise management signal processing operation. In this manner, each individual NCE controller may simultaneously perform their respective noise cancellation and enhancement operation on the noise sensor outputs delivered to the A2B interface. Accordingly, reduced wiring is necessary to deliver noise sensor output, while overall latency is significantly reduced. In addition, one or more individual NCE controllers may be removed, replaced, or added so as to improve the flexibility of the NM system. That is, flexibility of the NM architecture and suppliers of the NM system is improved. Therefore, the NM system is not limited to a single NM module as is the case in the current state of art. In addition, should a NCE controller associated with a particular noise management signal processing operation experience technical difficulties, the targeted NCE controller can be replaced without requiring replacement of the remaining NCE controllers.

As used herein, the term "module" or "unit" refers to an application specific integrated circuit (ASIC), a field programmable gate array (FPGA), an electronic circuit, an electronic computer processor (shared, dedicated, or group) and memory that executes one or more software or firmware programs, a hardware microcontroller, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

While various non-limiting embodiments have been described with reference to exemplary embodiments, it will be understood by those skilled in the art that various changes may be made and equivalents may be substituted for elements thereof without departing from the scope. In addition, many modifications may be made to adapt a particular situation or material to the teachings without departing from the essential scope thereof. Therefore, it is intended that the disclosure not be limited to the particular embodiments disclosed, but will include all embodiments falling within the scope of the application.

What is claimed is:

1. A vehicle, comprising:
    a body having an exterior portion and an interior portion;
    a plurality of sensors installed on the vehicle, each sensor configured to detect noise existing in at least one of the exterior portion and the interior portion, and to output at least one noise signal indicative of the detected noise;
    a plurality of noise cancellation and enhancement (NCE) controllers in signal communication with at least one sensor among the plurality of sensors, each NCE controller configured to perform at least one noise management signal processing operation based on the at least one noise signal; and
    an automotive audio bus (A2B) interface configured to receive the at least one noise signal and deliver the at least one noise signal to the at least one of the NCE controllers,
    wherein the at least one noise management signal processing operation includes:
    comparing, with at least one of the NCE controllers, a first noise signal associated with the exterior portion to a second noise signal associated with the interior portion;
    generating, with at least one of the NCE controllers, a post-processed signal in response to phase-shifting the first noise signal based on the second noise signal; and
    converting the post-processed signal into an audio signal that is emitted into the interior portion of the vehicle such that the noise associated with the exterior portion is at least one of suppressed and enhanced.

2. The vehicle of claim 1, wherein the sensors and the NCE controllers are connected to the A2B interface in a daisy-chain configuration.

3. The vehicle of clam 2, wherein the sensors includes at least one accelerometer located at the exterior portion and at least one microphone located at the interior portion.

4. The vehicle of claim 2, wherein each NCE controller among the plurality of NCE controllers performs a different noise management signal processing operation with respect to one another.

5. The vehicle of claim 2, wherein the A2B interface is a clock-driven twisted-pair digital communication bus.

6. A noise management system installed in a vehicle, the noise management system comprising:
- an automotive audio bus (A2B) interface configured to transfer data thereon;
- at least one first sensor configured to monitor an exterior environment of the vehicle and at least one second sensor configured to monitor an interior environment of the vehicle, the at least one first sensor configured to output first data to the A2B interface indicative of exterior noise and the at least one second sensor configured to output second data to the A2B interface indicative of interior noise; and
- a plurality of noise cancellation and enhancement (NCE) controllers connected to the A2B interface, the plurality of NCE controllers configured to generate post-processed data in response to performing a noise management signal processing operation based on at least one of the first and second data received from the A2B interface,
- wherein the post-processed data is converted into an audio signal that is output so as to at least one of suppress and enhance the exterior noise.

7. The noise management system of claim 6, wherein the at least one first sensor, the at least one second sensor, and the plurality of NCE controllers are connected to the A2B interface in a daisy-chain configuration.

8. The noise management system of claim 7, wherein the at least one noise management signal processing operation includes:
- comparing, using at least one NCE controller among the plurality of NCE controllers, the first data associated with the exterior portion to the second data associated with the interior portion; and
- generating, using at least one NCE controller among the plurality of NCE controllers, the post-processed signal in response to shifting phase data included in the first data based on the second data.

9. The noise management system of clam 7, wherein the at least one first sensor is an accelerometer and the at least one second sensor is a microphone.

10. The noise management system of claim 7, wherein each NCE controller among the plurality of NCE controllers performs a different noise management signal processing operation with respect to one another.

11. The noise management system of claim 10, wherein a first NCE controller outputs a first post-processed signal and a second NCE controller, different from the first NCE controller, simultaneously outputs a second post-processed signal.

12. The noise management system of claim 7, wherein the A2B interface is a clock-driven twisted-pair digital communication bus.

13. A method of managing noise associated with an automotive vehicle, the method comprising:
- detecting, using at least one sensor, noise existing in an exterior portion of the vehicle and an interior portion of the vehicle, and outputting at least one noise signal indicative of the detected noise;
- performing, with a first noise cancellation and enhancement (NCE) controller, a first noise management signal processing operation based on the at least one noise signal, and performing, with a second NCE controller, a second noise management signal processing operation based on the at least one noise signal;
- receiving, by an automotive audio bus (A2B) interface, a first post-processed signal from the first NCE controller and a second post-processed signal from the second NCE controller;
- converting, by a third NCE controller different from the first and second NCE controllers, the first and second post-processed signals into an audio signal; and
- outputting the audio signal into the interior portion of the vehicle so as to at least one of suppress and enhance noise associated with the exterior portion of the vehicle.

14. The method of claim 13, wherein the at least one noise management signal processing operation includes:
- comparing a first noise signal associated with the exterior portion to a second noise signal associated with the interior portion; and
- generating the first and second post-processed signals in response to phase-shifting the first noise signal based on the second noise signal.

15. The method of claim 13, wherein the at least one sensor and the plurality of NCE controllers are connected to the A2B interface in a daisy-chain configuration.

16. The method of clam 13, wherein the at least one sensor includes at least one accelerometer located at the exterior portion and at least one microphone located at the interior portion.

17. The method of claim 13, wherein each NCE controller among the plurality of NCE controller performs a different noise management signal processing operation with respect to one another.

18. The method of claim 17, wherein a first NCE controller outputs a first post-processed signal and a second NCE controller, different from the first NCE controller, simultaneously outputs a second post-processed signal.

19. The method of claim 13, wherein the A2B interface is a clock-driven twisted-pair digital communication bus.

* * * * *